United States Patent Office 3,022,319
Patented Feb. 20, 1962

1

3,022,319
2-(1-ALKYNYLCYCLOALKYLOXY)TETRA-
HYDROPYRANS
Margaret D. Cameron, Dayton, Ohio, assignor to Monsanto Chemical Company, St. Louis, Mo., a corporation of Delaware
No Drawing. Filed June 4, 1956, Ser. No. 588,989
6 Claims. (Cl. 260—345.9)

This invention relates to acetylenic ethers and more particularly to tetrahydropyranyl ethers of tertiary acetylenic alcohols, to a process of making the same, and compositions and methods for the application of the novel ethers as herbicides and as fungicides.

The novel compounds of this invention are prepared by addition of a tertiary acetylenic alcohol to a dihydropyran compound as illustrated by the following equation:

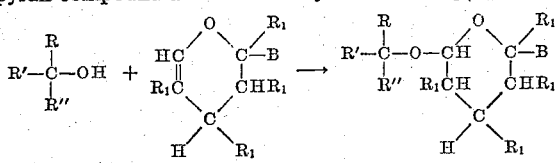

where $R_1$ is selected from hydrogen and a lower alkyl radical, B is selected from hydrogen, the carboxaldehyde radical, and lower alkyl or lower alkoxy radicals, R is a lower alkynyl radical, R' and R" taken separately are hydrocarbon radicals of from 1 to 10 carbon atoms and free of aliphatic unsaturation and R' and R" taken together with the carbon atom to which they are attached represent the carbon atoms necessary to complete a cycloaliphatic nucleus having from 5 to 7 carbon atoms in the cycloaliphatic ring and containing a total of from 5 to 10 carbon atoms, any substituents on the said cycloaliphatic nucleus being alkyl substituents. By aliphatic unsaturation is herein meant carbon-to-carbon, olefinic or acetylenic unsaturation.

It has been known hitherto to add primary acetylenic alcohols to dihydropyrans to form tetrahydropyran ethers. In accordance with this invention, there are provided a new and valuable class of acetylenic tetrahydropyranyl ethers wherein the acetylenic radical contains a tertiary carbon atom juxtaposed to the ether oxygen atom. Exemplary of tertiary acetylenic alcohols which may be used as starting materials for the preparation of ethers in accordance with this invention are acyclic tertiary alcohols such as 2-methyl-4-pentyn-2-ol, aryl and alkaryl tertiary alcohols such as 1,1-di-p-tolyl-3-butyn-1-ol, cycloaliphatic radicals such as 1-(2-propynyl)cyclohexanol, etc. Particularly preferred in the present process are the tertiary acetylenic alcohols synthesized by the addition of one mole of an acetylene to one mole of a ketone to form an alkynyl carbinol wherein the carbinol carbon atom is alpha to the acetylenically bonded carbon atoms, as illustrated by the following equation:

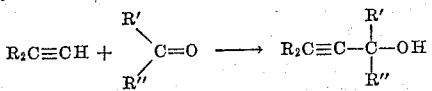

where $R_2$ represents hydrogen or a lower alkyl radical, and R' and R" are as defined hereinabove. The class of tertiary acetylenic alcohols of the above formula wherein R' and R" represent acyclic hydrocarbon radicals free of aliphatic unsaturation and containing from 1 to 10 carbon atoms, includes, e.g., 2-methyl-3-butyn-2-ol,
3-methyl-1-pentyn-3-ol,
3-ethyl-1-pentyn-3-ol,

2

3-methyl-1-hexyn-3-ol,
3,4-dimethyl-1-pentyn-3-ol,
3-methyl-1-heptyn-3-ol,
3,4-dimethyl-1-hexyn-3-ol,
3,4,4-trimethyl-1-pentyn-3-ol,
2-methyl-3-pentyn-2-ol,
2-methyl-3-heptyn-2-ol,
3-methyl-1-tridecyn-3-ol, etc.

Carbocyclic tertiary acetylenic alcohols which may be added to dihydropyran compounds in accordance with this invention include those wherein at least one of R' and R" taken separately represents an aromatic or cycloaliphatic radical, such as 1,1-diphenyl-2-propyn-1-ol, 2-phenyl-3-butyn-2-ol, 2-cuminyl-3-butyn-2-ol, 1,1-dicyclohexyl-2-propyn-1-ol, etc. The class of carbocyclic tertiary acetylenic alcohols useful in the practice of the present invention also includes the acetylenic alcohols wherein R' and R" taken together with the carbon atom to which they are attached represent a cycloaliphatic nucleus having from 5 to 7 carbon atoms in the nucleus and containing a total of from 5 to 10 carbon atoms, any substituents on the said cycloaliphatic nucleus being alkyl radicals. Examples of this class of tertiary acetylenic alcohols are 1-ethynylcyclohexanol,
1-ethynylcyclopentanol,
1-ethynyl-2-methylcyclohexanol,
1-ethynyl-4-methylcyclohexanol,
1-ethynyl-4-isopropylcyclohexanol,
1-(1-propynyl)-4-methylcyclohexanol,
1-ethynyl-4-t-butylcyclohexanol,
1-ethynylcycloheptanol, etc.

In accordance with this invention, the tertiary acetylenic alcohol is added to a dihydropyran to form an ether. The presently preferred dihydropyrans are the 3,4-dihydro-2H-pyrans wherein the oxygen atom of the dihydropyran nucleus is directly linked to an olefinic carbon atom. One readily available class of dihydropyrans conforming to this formula and useful in the process of the invention comprises 3,4-dihydro-2H-pyran and alkyl-3,4-dihydro-2H-pyrans, e.g., 3-methyl-3,4-dihydryo-2H-pyran,
3-ethyl-3,4-dihydro-2H-pyran,
2-methyl-3,4-dihydro-2H-pyran,
3-t-amyl-3,4-dihydro-2H-pyran,
4-isopropyl-3,4-dihydro-2H-pyran,
2,2-dimethyl-3,4-dihydro-2H-pyran,
2,2,3-trimethyl-3,4-dihydro-2H-pyran, etc.

Another class of dihydropyran compounds amenable to the process of the invention and useful in the preparation of the present novel compounds are the 2-alkoxydihydropyrans, e.g., 2-methoxy-3,4-dihydro-2H-pyran,
2-ethoxy-3,4-dihydro-2H-pyran,
2-isobutoxy-3,4-dihydro-2H-pyran,
2-(2-methylpentoxy)-3,4-dihydro-2H-pyran, etc., as well as the alkyl-2-alkoxydihydropyrans such as 2-methoxy-3-ethyl-3,4-dihydro-2H-pyran,
2-methoxy-3-isopropyl-3,4-dihydro-2H-pyran,
2-ethoxy-3-ethyl-3,4-dihydro-2H-pyran,
2-methoxy-2-methyl-3,4-dihydro-2H-pyran,
2-methoxy-2-methyl-3-ethyl-3,4-dihydro-2H-pyran,
2-ethoxy-2,5-diethyl-3,4-dihydro-2H-pyran,
2-methoxy-3,4-dimethyl-3,4-dihydro-2H-pyran,
2-butoxy-5-isobutyl-3,4-dihydro-2H-pyran, etc.

A further available class of dihydropyran compounds which undergo the process of the invention are the dihydropyrancarboxaldehydes, which are readily prepared via dimerization of unsaturated aldehydes, e.g., acrolein dimer

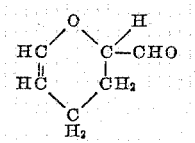

methacrolein dimer

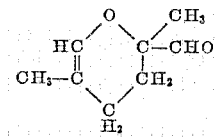

and crotonaldehyde cyclic dimer of the formula

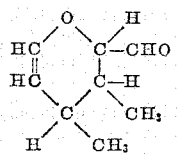

The products of the invention are 2-tetrahydropyranyl ethers. A particularly preferred class of such ethers provided by this invention are the tetrahydropyranyl ethers derived from 3,4-dihydro-2H-pyran, wherein each of the $R_1$ and B substituents in the above formulae represent hydrogen atoms. As examples of the presently provided class of tetrahydropyranyl ethers with alkynyl tertiary alcohols may be listed, e.g., the products of the reaction of 3,4-dihydro-2H-pyran with acyclic t-alkynyl-ols such as 2-(1,1-dimethylpropynyloxy)tetrahydropyran,
2-(1-ethyl-1-methylpropynyloxy)tetrahydropyran,
2-(1,1-diethylpropynyloxy)tetrahydropyran,
2-(3-methyl-1-hexynyl-3-oxy)tetrahydropyran,
2-(3,4-dimethyl-1-pentynyl-3-oxy)tetrahydropyran,
2-(3-methyl-1-heptynyl-3-oxy)tetrahydropyran,
2-(3,4-dimethyl-1-hexynyl-3-oxy)tetrahydropyran,
2-(3,4,4-trimethyl-1-pentynyl-3-oxy)tetrahydropyran,
2-(2-methyl-3-pentynyl-2-oxy)tetrahydropyran,
2-(2-methyl-3-heptynyl-2-oxy)tetrahydropyran, etc.

The class of presently provided tetrahydropyranyl ethers of cyclic tertiary acetylenic alcohols includes aromatic acetylenic ethers such as 2-(1,1-diphenylpropynyloxy)tetrahydropyran,
2-(2-phenyl-3-butynyl-2-oxy)tetrahydropyran,
2-(2-cuminyl-3-butynyl-2-oxy)tetrahydropyran,
2-(1,1-di-p-tolylpropynyloxy)tetrahydropyran, etc., as well as ethers of cycloalkyl acetylenic tertiary alcohols such as 2-(1,1-dicyclohexylpropynyl-oxy)tetrahydropyran and 2-(1-ethynylcyclohexyloxy)tetrahydropyran,
2-(1-(1-propynyl)cyclohexyloxy)tetrahydropyran,
2-(1-(2-propynyl)cyclohexyloxy)tetrahydropyran,
2-(1-ethynylcycloheptyloxy)tetrahydropyran,
2-(1-ethynyl-4-methylcyclohexyloxy)tetrahydropyran,
2-(1-ethynyl-4-t-butylcyclohexyloxy)tetrahydropyran, etc.

Also provided by this invention are the ethers of tertiary acetylenic alcohols with alkyl-substituted tetrahydropyrans, such as 4-ethyl-2-(1,1-dimethylpropynyloxy)tetrahydropyran,
4-methyl-2-(1,1-dimethylpropynyloxy)tetrahydropyran,
2,2-dimethyl-6-(1,1-dimethylpropynyloxy)tetrahydropyran,
3-ethyl-2-(1-ethyl-1-methylpropynyloxy)tetrahydropyran,
3-ethyl-2-(1,1-di-2,4-xylylpropynyloxy)tetrahydropyran,
2-(1-cuminyl-1-methylpropynyloxy)-3,6,6-trimethyltetrahydropyran,
2-(1-ethynylcyclohexyloxy)-3-methyltetrahydropyran, etc.

The compounds obtainable by the addition of tertiary acetylenic alcohols to dihydropyran ethers and alkyldihydropyran ethers are diethers which are alkoxy-alkynyloxy-tetrahydropyrans, and alkoxy-alkyl-alkynyloxy-tetrahydropyrans. As examples of such tetrahydropyran diethers may be listed the ethers with acyclic tertiary acetylenic alcohols such as 2-methoxy-6-(1,1-dimethylpropynyloxy)tetrahydropyran,
2-methoxy-3-ethyl-6-(1,1-dimethylpropynyloxy)tetrahydropyran,
2-methoxy-3-ethyl-6-(1-methyl-1-ethylpropynyloxy)tetrahydropyran,
2-butoxy-6-(1,1-dimethylpropynyloxy)tetrahydropyran,
2-ethoxy-3-ethyl-6-(1,1-dimethylpropynyloxy)tetrahydropyran,
2-methoxy-3-ethyl-6-3,4,4-trimethyl-1-pentynyl-3-oxy)tetrahydropyran,
2-methoxy-3,4,4-trimethyl-6-(2-methyl-4-pentynyl-2-oxy)tetrahydropyran,
2-amyloxy-3-amyl-6-(1,1-dimethylpropynyloxy)tetrahydropyran, etc.

Examples of such tetrahydropyran diethers wherein the alkynyloxy ether radical contains a cyclic nucleus are e.g., 2-methoxy-6-(1,1-diphenylpropynyloxy)tetrahydropyran,
2-methoxy-3-ethyl-6-(1,1-di-p-tolylpropynyloxy)tetrahydropyran,
2-isobutoxy-3-methyl-6-(1,1-diphenylpropynyloxy)tetrahydropyran,
2-ethoxy-6-(1-ethynylcyclohexyloxy)tetrahydropyran,
2-methoxy-3-ethyl-6-(1-(1-propynyl)cyclohexyloxy)tetrahydropyran,
2-methoxy-3-isopropyl-6-(1-(2-propynyl)-4-methylcyclohexyloxy)tetrahydropyran,
2-methoxy-3-ethyl-6-(1-ethynyl-2,4-dimethylcyclohexyloxy)tetrahydropyran, etc.

A further class of compounds provided by this invention are the tetrahydropyrancarboxaldehyde ethers. As examples of the presently afforded ethers which may be derived from acrolein dimer may be listed, e.g., 6-(1,1-dimethylpropynyloxy)tetrahydropyran-2-carboxaldehyde,
6-(1,1-diethylpropynyloxy)tetrahydropyran-2-carboxaldehyde,
6-(3,4-dimethyl-1-pentynyl-3-oxy)tetrahydropyran-2-carboxaldehyde,
6-(3-methyl-1-heptynyl-3-oxy)tetrahydropyran-2-carboxaldehyde,
6-(2-methyl-3-pentynyl-2-oxy)tetrahydropyran-2-carboxaldehyde,
6-(1,1-diphenylpropynyloxy)tetrahydropyran-2-carboxaldehyde,
6-(2-phenyl-3-butynyl-2-oxy)tetrahydropyran-2-carboxaldehyde,
6-(1-ethynylcyclohexyloxy)tetrahydropyran-2-carboxaldehyde,
6-(1-ethynyl-4-isopropylcyclohexyloxy)tetrahydropyran-2-carboxaldehyde,
6-(1-(1-propynyl)cycloheptyloxy)tetrahydropyran-2-carboxaldehyde, etc.

Similarly, from methacrolein dimer may be obtained 2,5-dimethyl-6-(1,1-dimethylpropynyloxy)tetrahydropyran-2-carboxaldehyde,
2,5-dimethyl-6-(1,1-diethylpropynyloxy)tetrahydropyran-2-carboxaldehyde,
2,5-dimethyl-6-(2-methyl-3-pentynyl-2-oxy)tetrahydropyran-2-carboxaldehyde,
2,5-dimethyl-6-(3,4,4-trimethyl-1-pentynyl-3-oxy)tetrahydropyran-2-carboxaldehyde,
2,5-dimethyl-6-(2-p-tolyl-3-butynyl-2-oxy)tetrahydropyran-2-carboxaldehyde, 2,5 - dimethyl - 6 - (1 - ethynylcyclohexyloxy)tetrahydro-
pyran-2-carboxaldehyde,
2,5 - dimethyl - 6 - (1 - ethynyl - 4 - isoamylcyclohexyl-
oxy)tetrahydropyran-2-carboxaldehyde, etc.

Derivatives obtainable from the cyclic dimer of croton-
aldehyde illustrated above include, e.g., 3,4-dimethyl - 6 - (1,1 - dimethylpropynyloxy)tetrahydro-
pyran-2-carboxaldheyde,
3,4 - dimethyl - 6 - (3 - methyl - 1 - heptynyl - 3 - oxy)-
tetrahydropyran-2-carboxaldehyde,
3,4 - dimethyl - 6 - (1,1 - diphenylpropynyloxy)tetrahy-
dropyran-2-carboxaldehyde,
3,4 - dimethyl - 6 - (1 - ethynylcyclohexyloxy)tetrahydro-
pyran-2-carboxaldehyde,
3,4 - dimethyl - 6 - (1 - (1 - propynyl) - 4 - methylcyclo-
hexyloxy)tetrahydropyran-2-carboxaldehyde, etc.

In similar fashion, where the alkoxy- and alkyldihydro-
pyrain-2-carboxaldehyde starting materials conforming to
the above formula are available, there may be prepared 3 - ethyl - 5 - methoxy - 2,5 - dimethyl - 6 - (1,1 - di-
methylpropynyloxy)tetrahydropyran-2-carboxaldehyde,
2 - methyl - 6 - (1,1 - diethylpropynyloxy)tetrahydropy-
ran-2-carboxaldehyde,
3 - isobutyl - 6 - (1,1-di-p-tolylpropynyloxy)tetrahydropy-
ran-2-carboxaldehyde, etc.

In carrying out the preparation of the present ethers,
the dihydropyran compound is simply contacted with the
tertiary acetylenic alcohol under slightly acid conditions
until the action is complete. Preferably, the reactants
are contacted in approximately equimolecular amounts,
although a slight excess of either component may be
used if desired. Large excesses of the alcohol should
usually be avoided when the alcohol is being reacted
with an alkoxydihydropyran or dihydropyran carbox-
aldehyde, to avoid undesired side reactions such as dis-
placement of the alkoxy group or formation of an acetal
with the carboxaldehyde group. Solvents or diluents
may be used, if desired, but are not generally necessary;
examples of suitable solvents which may be used to
dilute the reaction mixture are, e.g., benzene, hexane, di-
ethyl ether, dioxane, dichlorobenzene, etc. Generally, the
reaction of the alcohol with the dihydropyran compound
proceeds readily and is frequently found to be exothermic.
If desired, the reaction temperature may be controlled,
e.g., by dilution with inert solvents or by cooling; the
application of heat to accelerate completion of the re-
action is generally unnecessary. Sub- or superatmos-
pheric pressures may be applied, depending on the tem-
perature conditions of the reaction, but the pressure
variation is ordinarily without advantages.

The process of the invention is executed in the presence
of an acid reacting material. Suitable acids are, e.g.,
strong mineral acids, acid salts, or organic acids, as well
as materials which react in situ to produce acidic condi-
tions. The acidic catalyst desirably is one that is soluble
in the reaction mixture, although substantially insoluble
acidic materials may be used. Suitable catalysts include,
e.g., mineral acids, such as hydrochloric acid, sulfuric
acid, nitric acid, phosphoric acid, etc., acidic salts such as
sodium bisulfate, sodium dihydrogen phosphate, alumi-
num sulfate, etc., and organic acids such as oxalic acid,
p-toluenesulfonic acid, and acetic acid. The acidic ma-
terial need be present only in catalytic amounts, a pre-
ferred range being from about 0.10% to about 1% by
weight of reactant, though it is not excluded to operate
with greater or lesser amounts thereof.

Preferably, substantially anhydrous conditions are
employed.

On completion of the reaction, the desired product may
be recovered in any suitable manner, as by fractional dis-
tillation, extraction with selective solvents, or other ap-
plicable procedures. Any unreacted starting materials
may be employed in the preparation of further quantities
of the desired product. Both batchwise and continuous
processes are operable in the preparation of the present
novel products.

The ethers provided by this invention are generally
stable liquid materials. They may be employed for a
wide variety of agricultural and industrial purposes.
Thus, for example, the ethers derived from long-chain
alkynyl alcohols may be used as surfactive agents. The
ethers containing a terminal acetylenic hydrogen atom
may be used as hypnotics. The cyclic ethers prepared by
the process of the invention are also useful as modifying
and processing reagents in the textile industry. The com-
pounds of the invention are additionally biological toxi-
cants and may be used, e.g., as pharmaceuticals and as
agricultural pesticides, e.g., as nematocides, molluscacides,
insecticides, etc. The 1-alkynylcyclohexyl ethers are
especially effective as herbicides. The t-alkynyl ethers
are particularly useful as fungicides.

The invention is illustrated but not limited by the fol-
lowing examples:

*Example 1*

This invention illustrates the preparation of a t-alkynyl-
oxytetrahydropyran.

2-methyl-3-butyn-2-ol (34 g., 0.40 mole) containing a
few drops of concentrated hydrochloric acid was gradual-
ly mixed with 34 g. (0.40 mole) of 3,4-dihydro-2H-pyran.
The reaction was strongly exothermic. The mixture was
allowed to stand with occasional shaking for several
hours. There was then added to the reaction mixture
2 g. of sodium hydroxide and the mixture was shaken
vigorously. After this, the reaction mixture was dis-
tilled. Eight grams of the carbinol were recovered, and
there were obtained 54 g. of 2-(1,1-dimethylpropynyloxy)
tetrahydropyran, b. 90–92° C./17 mm., analyzing as
follows:

| Percent | Found | Calcd. for $C_{10}H_{16}O_2$ |
|---|---|---|
| C | 70.43 | 71.3 |
| H | 10.02 | 9.6 |

*Example 2*

This example illustrates the addition of a tertiary
alkynyl alcohol to an alkoxyalkyldihydropyran.

Utilizing the procedure of Example 1, 34 g. (0.40
mole) of 2-methyl-3-butyn-2-ol were reacted with 57 g.
(0.40 mole) of 2-methoxy-3-ethyl-3,4-dihydro-2H-pyran,
to give 45 g. of 6-(1,1-dimethylpropynyloxy)-3-ethyl-2-
methoxytetrahydropyran, b. 122–126° C./17 mm., the
identification of which was confirmed by the following
analysis:

| Percent | Found | Calcd. for $C_{13}H_{22}O_3$ |
|---|---|---|
| C | 69.47 | 69.5 |
| H | 9.39 | 9.88 |

*Example 3*

This example illustrates the preparation of an alkynyl-
cycloalkyloxytetrahydropyran.

By the procedure of Example 1, 49.6 g. (0.40 mole) of
1-ethynylcyclohexanol were reacted with 33.6 g. (0.40
mole) of 3,4-dihydro-2H-pyran. There were recovered
from the reaction mixture 11.2 g. of unreacted 1-ethynyl-
cyclohexanol, and there were obtained 49.3 g. of 2-(1-
ethynylcyclohexyloxy)tetrahydropyran, (59% conver-
sion; 76% yield on alcohol reacted). After redistilla-
tion, the physical properties of the 1-ethynylcyclohexyl
2-tetrahydropyranyl ether were as follows: b. 132–135°
C./17 mm., $n_D^{25}$ 1.4788.

*Example 4*

By the procedure of Example 1, 34.6 g. (0.25 mole) of 1-ethynyl-4-methylcyclohexanol were reacted with 21 g. (0.25 mole) of 3,4-dihydro-2H-pyran to give 29 g. of 2-(1-ethynyl-4-methylcyclohexyloxy)tetrahydropyran, b. 135–140° C./17 mm., $n_D^{25}$ 1.4718. The reaction was slightly exothermic.

Example 5

Similarly, by the reaction of 28 g. (0.20 mole) of 1-(1-propynl)cyclohexanol with 17 g. (0.20 mole) of 3,4-dihydro-2H-pyran, there is obtained 2-(1-(1-propynyl)cyclohexyloxy)tetrahydropyran, b. 110–115°/10 mm., $n_D^{25}$ 1.4793.

Example 6

Similarly, by the reaction of 1,1-diphenylpropargyl alcohol with 3,4-dihydro-2H-pyran-2-carboxaldehyde, there is obtained 6-(1,1-diphenylpropynyloxy)tetrahydropyran-2-carboxaldehyde.

Example 7

This example illustrates the herbicidal effectiveness of the present ethers.

Aluminum pan flats were filled with mixtures of two-thirds one-quarter mesh sieved soil, and one-third sand. Over one-third of the soil surface of each pan were scattered 20 seeds each of different kinds of grasses; seeds of broadleaf plants were randomly scattered over the remaining surface. The seeds were then covered with soil to the pan top and the pan was sprayed with an aqueous solution of fertilizer and an insecticide. The surfaces of the boxes were next sprayed with 30 cc. of an acetone solution of the test chemicals, containing the chemicals at a rate equal to 25 lbs. per acre. Then the pans were placed in water and allowed to absorb moisture until the soil surface was completely moist, after which they were held in a greenhouse under standard conditions of moisture and sunlight. After ten days, the number and species of plants which had germinated and grown were observed. The results are summarized in the following table wherein O=no phytotoxicity, i.e., germination equivalent to that usually obtained from the species of seed without application of a test chemical. The rating 3 corresponds to substantially complete suppression of plant germination and growth. The test chemicals utilized were as follows:

I. 2-(t-amyloxy)tetrahydropyran
II. 2-(2-propynyloxy)tetrahydropyran
III. 2-(1-ethynylcyclohexyloxy)tetrahydropyran
IV. 2-(1-(1-propynyl)cyclohexyloxy)tetrahydropyran cyclohexyloxy)tetrahydropyran was applied to grown plants, it was found that this compound also possesses a phytotoxic action as a foliage application. Thus, the present compounds may be used either for pre-emergent or post-emergent control of undesired vegetation.

Example 8

This example illustrates the evaluation of the t-alkynyl ethers of the invention as fungicides.

In the procedure of this test, Bonnie Best variety tomato plants are immersed in an aqueous emulsion of the test chemical for 48 hours. Then the roots of these tomato plants, plus a control plant which has not been treated with the test chemical, are washed and about one-third of the root system in each plant is torn off. The remaining roots on each plant are immersed in a suspension of *Fusarium oxysporum s. lycopersici* (the organism causing tomato wilt disease) for thirty seconds. The plants are then repotted and kept in a greenhouse. When the control plant, the tomato plant which has not been watered with a test chemical solution, shows marked disease symptoms, the plants are visually examined and then uprooted and submitted to examination of the vascular bundles of the roots to determine the extent of disease control obtained.

2-t-amyloxytetrahydropyran, b. 90–92° C./18 mm., $n_D^{25}$ 1.4340, was prepared by the reaction of 33.2 g. of 3,4-dihydro-2H-pyran with 35.3 g. of t-amyl alcohol; yield, 48.5 g. (71%). Emulsions were prepared of the 2-(1,1-dimethylpropynyloxy) tetrahydropyran of Example 1 and of 2-t-amyloxytetrahydropyran, by mixing 100 ml. of each of the ethers with one ml. of "Tween 20," a commercial emulsifying agent reputed to be a sorbitan monolaurate polyethylene oxide condensate. The solutions were then diluted with water to prepare emulsions containing 10 parts per million of the test chemicals.

Potted two-week old tomato plants were immersed in solutions of the test chemicals for 48 hours. After this, they were removed, the root systems washed and partially torn off, the plant roots immersed in suspensions of the tomato wilt disease organism, and the plants potted in sterile soil. A triple replication of the test was made for each of the chemicals. At the end of the growing period, when the control plant which had not received chemical treatment was dead, the plants which had been treated with the t-amyloxytetrahydropyran and dimethyl-

| Compound | Rate, lbs./acre | Grasses | | | | | Broadleaf | | | | |
|---|---|---|---|---|---|---|---|---|---|---|---|
| | | Wild Oat | Brome grass | Rye grass | Foxtail | Corn | Buck-wheat | Mustard | Red clover | Sugar beet | Cotton |
| 2-(t-Amyloxy)-tetrahydropyran | 25 | 0 | 0 | 0 | 0 | 0 | 0 | 0 | 0 | 0 | 0 |
| 2-(2-Propynyloxy)-tetrahydropyran | 25 | 0 | 0 | 0 | 0 | 0 | 0 | 0 | 0 | 0 | 0 |
| 2-(1-ethynylcyclohexyloxy)tetrahydropyran | 25 | 0 | 2 | 0 | 1 | 0 | 2 | 3 | 3 | | 3 |
| 2-(1-(1-propynyl)-cyclohexyloxy)-tetrahydropyran | 25 | 1 | 2 | 1 | 1 | 0 | 3 (a) | 3 | 3 | 3 (b) | 3 (c) |
| | 5 | 0 | 0 | 0 | 1 | 0 | | | | | | a Stunted—⅓ normal size.
b Stunted—⅔ normal size.
c Emergence delayed and incomplete.

The above data illustrate the selective phytotoxicity of the present alkynylcycloalkyloxytetrahydropyran ethers as preemergent herbicides. It will be seen from the data in the table that, whereas neither the primary alkynyloxytetrahydropyran, 2-(2-propynyloxy)tetrahydropyran, (II) or the 2-t-alkoxytetrahydropyran, 2-(2-t-amyloxy)-tetrahydropyran, (I) is phytotoxic to grass or to broadleaf species, the alkynylcycloalkyloxytetrahydropyrans of the invention are highly toxic and effective in suppressing emergence and growth of broadleaf plants; they are also to some extent toxic to grasses, though less so than to the broadleaf species.

Furthermore, in tests wherein 2-(1-ethynyl-4-methylpropynyloxytetrahydropyran ethers were examined. It was found that the extent of disease of the plants treated with the 2-t-amyloxytetrahydropyran was substantially the same as that of the control plant which had not received protective treatment. The plants which had been treated with the alkynlyloxy ether on the other hand, had been effectively protected from the disease and were still growing vigorously.

The t-amyloxytetrahydropyran is the saturated analog of the t-alkynyloxytetrahydropyran used in this experiment. This example illustrates that the present alkynyloxytetrahydropyran ethers are unexpectedly effective agricultural fungicides, since the acetylenic unsaturation confers properties absent in the otherwise identical saturated compound.

For the application of the present compounds as agricultural pesticides, i.e., as herbicides or fungicides, they may be applied directly to the desired substrate. However, because of the highly effective action of the present compounds, only very low concentrations need be utilized to obtain good results, and to insure even distribution of the relatively small amounts required, they are preferably incorporated with a carrier. Suitable carriers include, e.g., solid pulverulent materials such as talc, clay, pumice, or bentonite, etc. Another convenient method of formulating the present compounds for application to surfaces consists of spraying a solution or emulsion of the ether onto the surface. Liquid sprays suitable for application in this way may be prepared by dissolving the ether in an organic solvent such as a petroleum solvent, e.g., naphtha; the expenditures of large volumes of organic solvents may, however, be avoided, if desired, by extending a concentrated solution of the present ethers in an organic solvent by addition of an emulsifying agent and then water, to prepare an oil-in-water emulsion of the ether. As emulsifying agents for such purposes may be used any of the common surface-active emulsion adjuvants, e.g., alkylbenzenesulfonates, long-chain polyalkylene glycols, salts of sulfated fatty acid amides, etc. Surface-active agents may also be used to produce a temporary suspension or dispersion of the present ethers in water without the intervention of an organic solvent, if desired. Oil-in-water emulsions of the present compounds, which may readily be prepared to contain low concentrations, e.g., from 0.1% to 2% of active ingredient by weight, are, however, a particularly convenient form for use in applying the present ethers in the small concentrations required.

The alkynylcycloalkyloxytetrahydropyrans, as illustrated above, are particularly effective as selective pre-emergent herbicides. For this purpose, they may be applied to soil or other growth media at a rate, e.g., of about from 5 to 50 lbs. per acre. Generally, rates of from 5 to 25 lbs. per acre are effective in producing substantially complete chemical control of all broadleaf weeds. In addition to selective weeding of crops, the present compounds may be employed for eradication of undesired foliage in other locations, e.g., in areas adjacent to irrigation and drainage canals, in nursery gardens and flower beds, etc. If desired, they may be applied to soil in conjunction with other agricultural compositions, e.g., with herbicides having a more pronounced effect on grassy weeds, so that the combined result produces wide spectrum phytotoxic effect.

The new esters, furthermore, may be applied as foliage applications for the eradication of established vegetation. The rates necessarily vary, for example, from 5 to 50 lbs. per acre, depending on the herbicidal activity of the active ingredient and the manner of application, the weeds which are sought to destroy, etc. Typical rates will be on the order of from 5 to 50 lbs. per acre.

For the application of the present compounds as agricultural fungicides, compositions as described above are preferably employed, wherein the effective ingredient is diluted by inert carrier to obtain adequate distribution of the active ingredient. The ethers or the compositions containing the ethers may be applied to the plants themselves, or to the soil in which the plants which have contracted or may be exposed to the fungus disease are growing. It is to be understood that subphytotoxic amounts of the ethers will be employed in this application. The effective concentration for fungicidal application depends on the amount and type of emulsifying agent used, the active fungicidal ether utilized, the manner of application, etc., and can readily be adjusted and concentrations selected for particular applications by those skilled in the art.

What is claimed is:

1. A tetrahydropyranyl ether of the formula

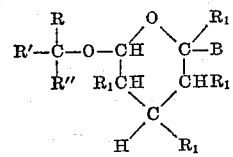

where R is a lower alkynyl radical, R' and R" taken together with the carbon atom to which they are attached represent the carbon atoms necessary to complete a cycloaliphatic nucleus having from 5 to 7 carbon atoms in the cycloaliphatic ring and containing a total of from 5 to 10 carbon atoms, any substituents on the said cycloaliphatic nucleus being alkyl substituents, $R_1$ is selected from the class consisting of hydrogen and lower alkyl radicals, and B is selected from the class consisting of hydrogen, the carboxaldehyde radical, lower alkyl radicals, and lower alkoxy radicals.

2. A 2-(1-alkynylcycloalkyloxy)tetrahydropyran of the formula

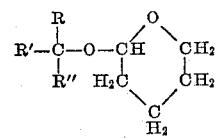

wherein R represents a lower alkynyl radical and R' and R" taken together with the carbon atom to which they are attached represent a cyclohexyl nucleus carrying no substituents replacing hydrogen atoms other than lower alkyl radicals, the cyclohexyl radical containing a total of from 6 to 10 carbon atoms.

3. 2-(1-ethynylcyclohexyloxy)tetrahydropyran.
4. 2-(1-ethynyl - 4 - methylcyclohexyloxy)tetrahydropyran.
5. 2-(1-(-propynyl)cyclohexyloxy)tetrahydropyran.
6. A compound selected from the group consisting of:

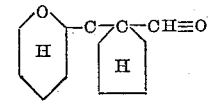

and

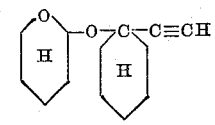

References Cited in the file of this patent
UNITED STATES PATENTS

| 2,619,491 | Smith | Nov. 25, 1952 |
| 2,755,219 | Beroza | July 17, 1956 |

FOREIGN PATENTS

| 805,643 | Germany | May 25, 1951 |

OTHER REFERENCES

Henbest et al. in "Chemical Abstracts," vol. 45, col. 7053a (1951).

Riobe: "Chemical Abstracts," vol. 48, pages 5184–5 (1954).

Julia et al.: "Chemical Abstracts," vol. 51, page 10420i (1957).

UNITED STATES PATENT OFFICE
CERTIFICATE OF CORRECTION

Patent No. 3,022,319            February 20, 1962

Margaret D. Cameron

It is hereby certified that error appears in the above numbered patent requiring correction and that the said Letters Patent should read as corrected below.

Column 5, line 9, for "-carboxaldheyde" read -- -carboxaldehyde --; column 10, lines 44 to 47, the formula should appear as shown below instead of as in the patent:

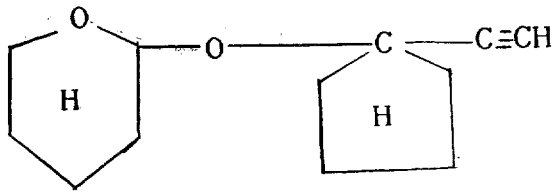

Signed and sealed this 26th day of June 1962.

(SEAL)
Attest:

ERNEST W. SWIDER
Attesting Officer

DAVID L. LADD
Commissioner of Patents